United States Patent
Ueyama et al.

(10) Patent No.: US 12,229,638 B2
(45) Date of Patent: Feb. 18, 2025

(54) LEARNING ASSISTANCE DEVICE, PROCESSING SYSTEM, LEARNING ASSISTANCE METHOD, AND STORAGE MEDIUM

(71) Applicant: OMRON Corporation, Kyoto (JP)

(72) Inventors: Yuki Ueyama, Kyoto (JP); Nobuyuki Sakatani, Otsu (JP); Yasuaki Abe, Takatsuki (JP); Kazuhiko Imatake, Osaka (JP); Takashi Fujii, Kyoto (JP)

(73) Assignee: OMRON Corporation, Kyoto (JP)

( * ) Notice: Subject to any disclaimer, the term of this patent is extended or adjusted under 35 U.S.C. 154(b) by 1193 days.

(21) Appl. No.: 16/977,469

(22) PCT Filed: Feb. 20, 2019

(86) PCT No.: PCT/JP2019/006185
§ 371 (c)(1),
(2) Date: Sep. 2, 2020

(87) PCT Pub. No.: WO2019/176480
PCT Pub. Date: Sep. 19, 2019

(65) Prior Publication Data
US 2021/0049506 A1 Feb. 18, 2021

(30) Foreign Application Priority Data
Mar. 14, 2018 (JP) .................. 2018-047258

(51) Int. Cl.
*G06N 20/00* (2019.01)
(52) U.S. Cl.
CPC .................. *G06N 20/00* (2019.01)

(58) Field of Classification Search
CPC .. G05B 13/027; G05B 23/0254; G06N 20/00; G06N 3/02; G06N 3/0454; G06N 3/08
See application file for complete search history.

(56) References Cited

U.S. PATENT DOCUMENTS 6,067,535 A * 5/2000 Hobson ............... H04W 12/12
706/16
6,415,273 B1 7/2002 Fujime
(Continued)

FOREIGN PATENT DOCUMENTS

| CN | 107256428 | 10/2017 |
| EP | 0712509 | 5/1996 |

(Continued)

OTHER PUBLICATIONS

Park, Daehyung, Yuuna Hoshi, and Charles C. Kemp. "A multimodal anomaly detector for robot-assisted feeding using an Istm-based variational autoencoder." IEEE Robotics and Automation Letters 3.3 (Feb. 2018): 1544-1551. (Year: 2018).*

(Continued)

*Primary Examiner* — Randall K. Baldwin
(74) *Attorney, Agent, or Firm* — JCIPRNET

(57) ABSTRACT

A learning assistance device according to the disclosure is designed to perform relearning for a processing part including a learning device that has already undergone learning for performing a prescribed output from a prescribed input, the learning assistance device including: an assessment part for assessing an anomaly of the input on the basis of a prescribed reference; and a relearning part for, if the assessment part has assessed that the input is anomalous, carrying out relearning of the learner under a prescribed condition using the anomalous input as additional learning data.

10 Claims, 8 Drawing Sheets

(56) References Cited

U.S. PATENT DOCUMENTS

| | | | | |
|---|---|---|---|---|
| 2012/0150334 A1* | 6/2012 | Arbogast | ............ | G05B 23/0254 |
| | | | | 700/110 |
| 2014/0067734 A1* | 3/2014 | Hawkins | .................. | G06N 7/01 |
| | | | | 706/58 |
| 2015/0074023 A1* | 3/2015 | Gu | ........................... | G06N 3/08 |
| | | | | 706/20 |
| 2015/0235133 A1* | 8/2015 | Aoki | ........................ | G06N 5/04 |
| | | | | 706/12 |
| 2017/0279834 A1* | 9/2017 | Vasseur | ................. | H04L 43/024 |
| 2018/0275642 A1* | 9/2018 | Tajima | .................. | G06N 3/044 |
| 2019/0147357 A1* | 5/2019 | Erlandson | ................ | G06N 3/08 |
| | | | | 706/12 |

FOREIGN PATENT DOCUMENTS

| | | |
|---|---|---|
| GB | 2321364 | 7/1998 |
| JP | H11231907 | 8/1999 |
| JP | 2018014838 | 1/2018 |
| WO | 2014042147 | 3/2014 |

OTHER PUBLICATIONS

Christiansen, Peter, et al. "DeepAnomaly: Combining background subtraction and deep learning for detecting obstacles and anomalies in an agricultural field." Sensors 16.11 (2016): 1904. (Year: 2016).*

Felker, Nick. "Correcting Image Anomalies Using Machine Learning." (2017). (Year: 2017).*

"Search Report of Europe Counterpart Application", issued on Oct. 18, 2021, p. 1-p. 8.

"International Search Report (Form PCT/ISA/210) of PCT/JP2019/006185", mailed on May 21, 2019, with English translation thereof, pp. 1-2.

"Written Opinion of the International Searching Authority (Form/ISA/237) of PCT/JP2019/006185", mailed on May 21, 2019, with English translation thereof, p. 1-p. 8.

"Office Action of Europe Counterpart Application", issued on Feb. 28, 2023, pp. 1-5.

Fang Qi et al., "Research of Online Learning Analysis Strategy Algorithm Based on ART Neural Network", Laser Journal, Jul. 25, 2016, with English abstract, pp. 118-123, vol. 37, No. 7.

"Office Action of China Counterpart Application", issued on May 15, 2023, with English translation thereof, pp. 1-19.

* cited by examiner

Input considered to be anomalous   Threshold value of group considered to be substantially normal

LEARNING ASSISTANCE DEVICE, PROCESSING SYSTEM, LEARNING ASSISTANCE METHOD, AND STORAGE MEDIUM

CROSS-REFERENCE TO RELATED APPLICATION

This application is a 371 application of the International PCT application serial no. PCT/JP2019/006185, filed on Feb. 20, 2019, which claims the priority benefits of Japan Patent Application No. 2018-047258, filed on Mar. 14, 2018. The entirety of each of the above-mentioned patent applications is hereby incorporated by reference herein and made a part of this specification.

BACKGROUND

Technical Field

The disclosure relates to a learning assistance device, a processing device including the same, a learning assistance method, and a learning assistance program.

Related Art

In recent years, for the control on performing an appropriate output from a predetermined input, a large number of control devices using a learning device have been disclosed (e.g., Patent Document 1). In such a learning device, learning is performed by using learning data given in advance, but in the case where the output accuracy of the learning device decreases, it is necessary to perform relearning of the learning device to which additional learning data is added. The timing of such relearning is arbitrarily determined by a user.

RELATED ART DOCUMENTS

Patent Documents

Patent Document 1: Japanese Patent Application Laid-Open No. 2018-014838

SUMMARY

Problems to be Solved

However, in the case where the timing of relearning is set by the determination of the user, relearning cannot be performed unless the reference of relearning is clear. Moreover, in the case where relearning is delayed, there is a possibility that inappropriate output will continue.

The disclosure has been made to solve this problem, and it is an objective of the disclosure to provide a learning assistance device, a processing device including the same, a learning assistance method, and a learning assistance program capable of efficiently performing relearning of a learning device.

Means for Solving the Problems

A learning assistance device according to the disclosure is a learning assistance device for performing relearning on a processing part having a learned learning device which has undergone learning for generating a predetermined output from a predetermined input. The learning assistance device includes an assessment part which assesses an anomaly of the input based on a predetermined reference, and a relearning part which, in the case where the assessment part assesses that the input is an anomalous input, performs relearning of the learning device by taking the anomalous input as additional learning data under a predetermined condition.

According to this configuration, when it is assessed that there is an anomalous input, by performing relearning of the learning device, the learning device can undergo learning so that an ideal output can be generated even with an anomalous input. In other words, in the disclosure, since the relearning of the learning device is triggered by the occurrence of the anomalous input, relearning of the learning device can be performed automatically without having the user arbitrarily set the timing of relearning of the learning device. Moreover, since the update of the learning device with respect to the anomalous input can be performed without delay, the accuracy of the output of the learning device can be improved.

In the learning assistance device, the relearning part may be configured to perform the relearning on condition that the assessment part assesses that the input is an anomalous input. In other words, in the case where the assessment part assesses that the input is anomalous, relearning may be performed without relying on the determination of the user, i.e., without receiving an instruction from the user.

The learning assistance device may further include a notification part which notifies a user of occurrence of the anomalous input in the case where the assessment part assesses that the input is an anomalous input.

The learning assistance device may further include a notification part which notifies a user of occurrence of the anomalous input in the case where the assessment part assesses that the input is an anomalous input, and the relearning part may be configured to perform relearning when a command for relearning is sent in the case where the occurrence of the anomalous input is notified by the notification part.

In the learning assistance device, the relearning part may be configured to generate an ideal output with respect to the anomalous input by performing feedback control on an output outputted by the processing part from the anomalous input, and perform the relearning by taking the anomalous input and the ideal output as the additional learning data.

In the learning assistance device, in the case where the output outputted by the processing part from the input is based on a predetermined physical model, the relearning part may be configured to generate an ideal output with respect to the anomalous input based on the physical model and perform the relearning by taking the anomalous input and the ideal output as the additional learning data.

The disclosure provides a processing system which performs a predetermined output from a predetermined input. The processing system includes a processing part having a learned learning device which has undergone learning for performing the predetermined output from the predetermined input, and any of the leaning assistance device described above.

The disclosure provides a learning assistance method for performing relearning on a processing part having a learned learning device which has undergone learning for generating a predetermined output from a predetermined input. The learning assistance method includes a step of assessing an anomaly of the input based on a predetermined reference, and a step of performing, in the case where it is assessed that the input is an anomalous input, relearning of the learning device by taking the anomalous input as additional learning data under a predetermined condition.

In the learning assistance method, in the case where it is assessed that the input is an anomalous input, the relearning may be performed.

In the case where it is assessed that the input is an anomalous input, the learning assistance method may further include a step of notifying a user of occurrence of the anomalous input.

Moreover, in the case where the occurrence of the anomalous input is notified, a step of determining whether the relearning is necessary may be further included, and in the case where it is determined that the relearning is necessary, the relearning may be performed.

The disclosure provides a learning assistance program for performing relearning on a processing part having a learned learning device which has undergone learning for generating a predetermined output from a predetermined input, and the learning assistance program causes a computer to execute a step of assessing an anomaly of the input based on a predetermined reference, and a step of performing, in the case where it is assessed that the input is an anomalous input, relearning of the learning device by taking the anomalous input as additional learning data under a predetermined condition.

Effects

According to the disclosure, it is possible to efficiently perform relearning of a learning device.

DESCRIPTION OF THE EMBODIMENTS

Hereinafter, an embodiment of a learning assistance device, a learning assistance method, and a learning assistance program according to the disclosure will be described with reference to the drawings. However, the present embodiment described below is merely an example of the disclosure in all respects. Obviously, various improvements and modifications may be made without departing from the scope of the disclosure. In other words, in the implementation of the disclosure, a specific configuration according to the embodiment may be appropriately adopted. Although the data shown in the present embodiment is described in natural language, more specifically, it is specified by a computer-recognizable pseudo language, command, parameter, machine language, or the like.

1. APPLICATION EXAMPLE

Figure 1:
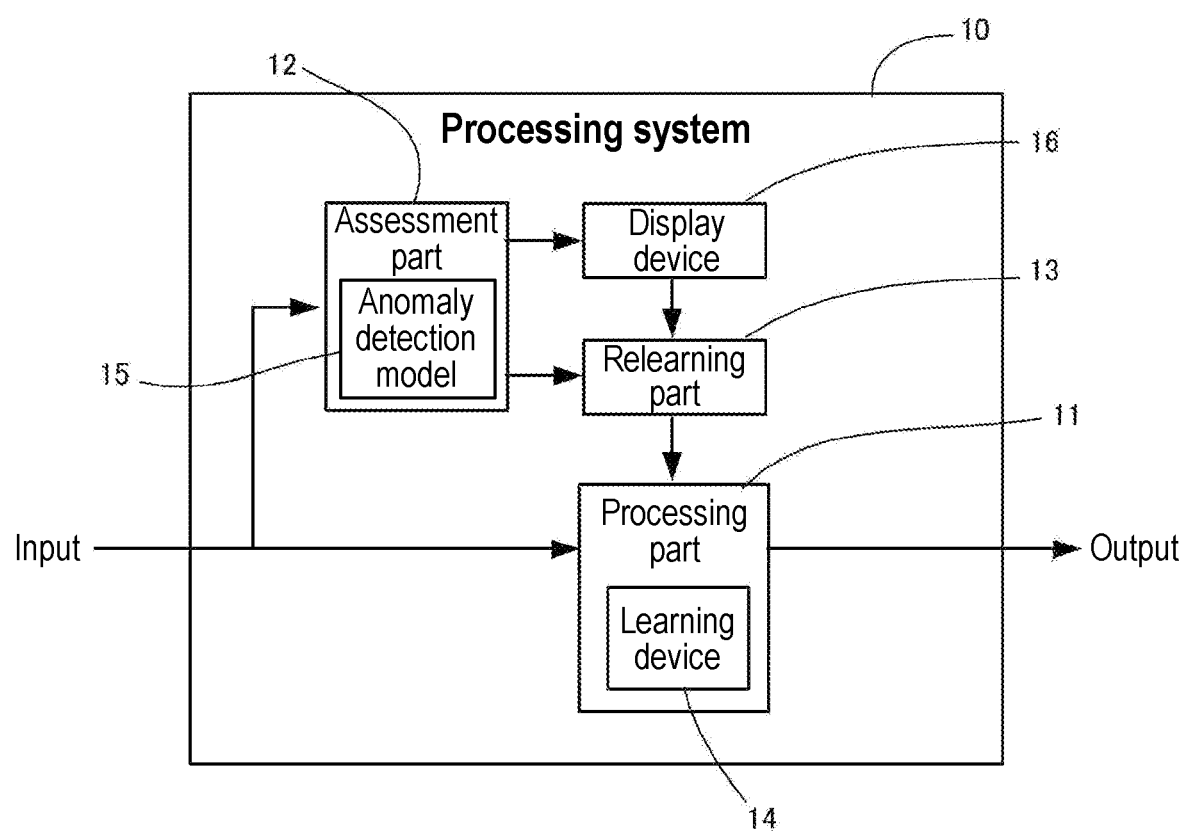
FIG. 1 is a block diagram schematically showing an embodiment of a processing device of the disclosure.

Hereinafter, the learning assistance device according to the present embodiment will be described with reference to FIG. 1. FIG. 1 is a block diagram showing a functional configuration of a processing system including a learning assistance device according to the present embodiment.

As shown in FIG. 1, the processing system 10 includes a processing part 11 which performs a certain output with respect to an input. The processing part 11 includes a learned learning device 14 which has been subjected to learning to perform a predetermined output with respect to an input. Further, the processing system includes an assessment part 12 which receives the input as the processing part 11 does, and the assessment part 12 assesses whether the input is an anomalous input. For example, in the case where there is an anomalous input which deviates from the normal input for a certain reason, the learning device 14 may not be able to properly perform an output with respect to such an anomalous input. Therefore, the processing system according to the present embodiment has the assessment part 12 for assessing an anomalous input in the case where there is an anomalous input. The assessment part 12 has an anomaly detection model 15 including a normal input pattern for assessing an anomalous input, and can assess whether the input is anomalous by referring to the model 15. It is noted that the anomalous input referred to herein includes an input which is obviously different from a normal one when seen by the user, but also refers to, for example, an input which appears normal but is different from an input as expected, or an input which does not satisfy a predetermined reference. In other words, while an obvious anomaly may be excluded from the learning target, the above seemingly normal one may be the first input that appears for the learning device, and such an input may be the one that should be subjected to relearning.

In the case where the assessment part 12 assesses that there is an anomalous input, the anomalous input is transmitted to a display device (notification part) 16 in the processing system. By displaying on the display device 16 that there is an anomalous input, the user can be informed of the anomalous input.

Then, in the case where the assessment part 12 assesses that there is an anomalous input, the processing system has a relearning part 13 for performing relearning of the learning device 14 using the anomalous input. The relearning part 13 generates additional learning data in which the anomalous input is taken as the input, and an ideal output corresponding to this input (specifically, an ideal output calculated by the relearning part 13 or included in the relearning part 13) is taken as the output, and the additional learning data is added to the current learning data of the learning device 14 to perform relearning of the learning device 14. Accordingly, it is possible to automatically determine that there is an anomalous input and immediately perform relearning of the learning device 14. Therefore, in the case where there is an anomalous input which may not be able to correspond to the learning device 14, learning of the learning device 14 is performed again to improve the output accuracy. In other words, it is possible to automatically set the timing of relearning.

It is noted that various settings may be performed for determining whether to perform relearning. For example, it may be set to immediately perform relearning when the assessment part 12 assesses that there is an anomalous input. Alternatively, it may be set to perform relearning according to the determination of the user after the user is informed of the anomalous input by the display device 16. Therefore, even if there is an anomalous input, it may be set not to perform relearning according to the determination of the user.

While the processing system according to the present embodiment may be applied to various types of processing, an example in which the processing system is applied to a motor control system will be described below. This motor control system controls the position of an object to be processed by a servo motor based on a torque value of the servo motor. The details will be described below.

2. CONFIGURATION EXAMPLE

<2-1. Hardware Configuration>

Figure 2:
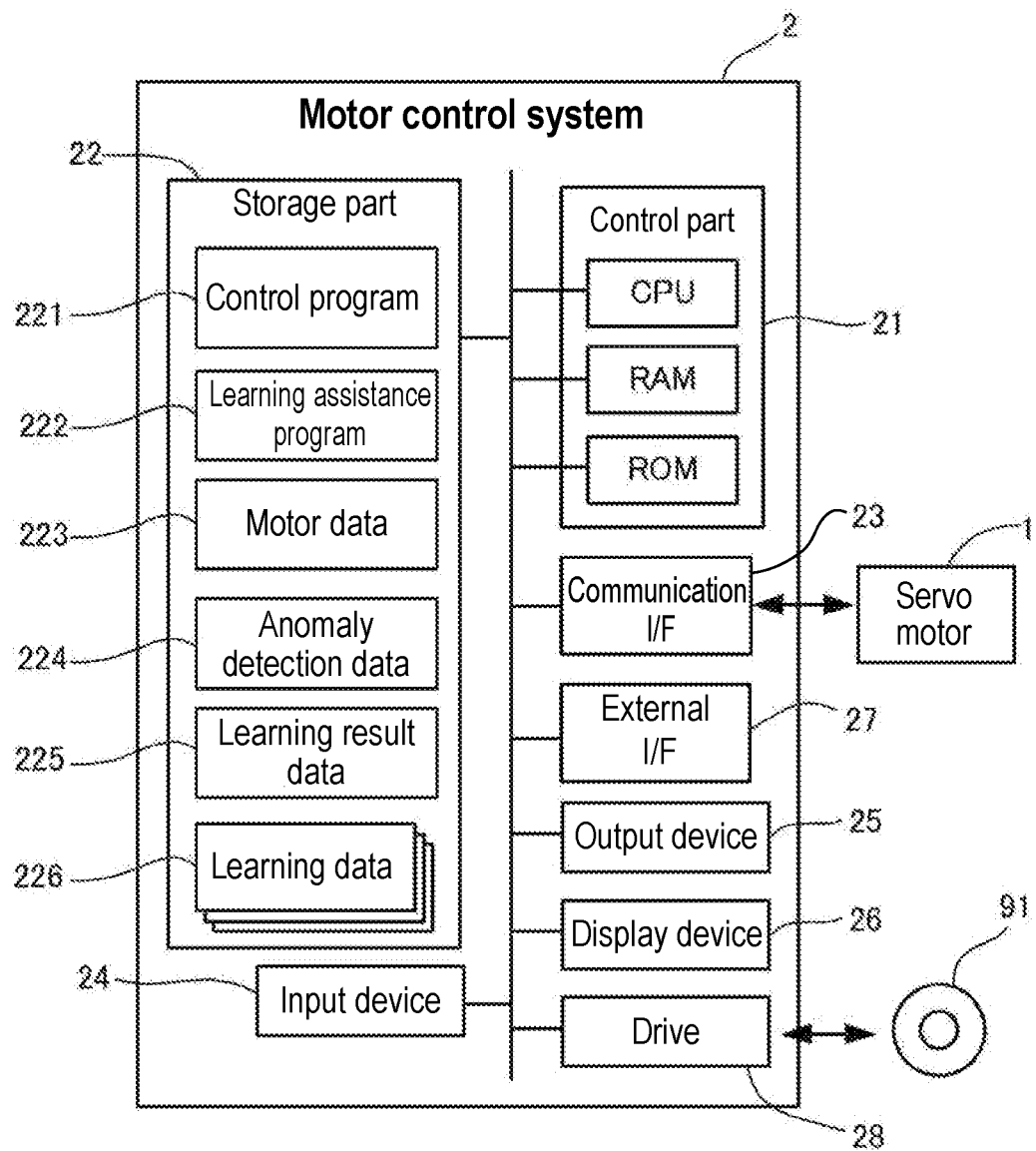
FIG. 2 is a block diagram showing an example in which the processing device according to the disclosure is applied to a motor control system.

First, the hardware configuration of a motor control system 2 including the learning assistance device according to the present embodiment will be described with reference to FIG. 2. FIG. 2 is a block diagram showing the hardware configuration of the motor control system according to the present embodiment.

<2-1-1. Servo Motor>

While a servo motor 1 shown in FIG. 2 is not particularly limited and may be a generally known one, herein, a torque waveform detected by the servo motor 1 is inputted to the motor control system 2. Then, the motor control system 2 samples the inputted torque waveform at a predetermined cycle (e.g., a cycle of 1 ms) and issues a position control command to the servo motor 1 according to the torque waveform.

<2-1-2. Controller>

As shown in FIG. 2, the motor control system 2 according to the present embodiment is a computer in which a control part 21, a storage part 22, a communication interface 23, an input device 24, an output device 25, a display device 26, an external interface 27, and a drive 28 are electrically connected to each other. In FIG. 2, the communication interface and the external interface are respectively shown as "communication I/F" and "external I/F".

The control part 21 includes a CPU (central processing unit), a RAM (random access memory), a ROM (read only memory), and the like and performs control on each component according to information processing. The storage part 22 is, for example, an auxiliary storage device such as a hard disk drive or a solid state drive, and stores a control program 221 executed by the control part 21, a learning assistance program 222, motor data 223 associated with input/output of motor control including torque data transmitted from the servo motor 1 and position command data to be outputted, anomaly detection data 224 for assessing an anomaly in the torque waveform of the servo motor 1, learning result data 225 indicating information associated with the learned learning device, learning data 226 for having the learning device undergo learning, and the like. In addition, various data necessary for driving the motor control system 2 may also be stored.

The control program 221 outputs a position control command, i.e., a position command, of the servomotor 1 according to the torque data obtained from the servo motor 1, and performs the output by the learning device. The learning assistance program 222 is a program for performing relearning of the learning device, and also performs anomaly assessment of the input which will be described later. The motor data 223 is data associated with the torque value inputted from the servo motor 1 and the position command value outputted to the servo motor 1. The anomaly detection data 224 is, for example, a model having a normal input pattern. The learning result data 225 is data for setting the learned learning device. The learning data 226 is data used for learning of the current learning device. Detailed description of the learning will be described later.

The communication interface 23 is, for example, a wired LAN (local area network) module, a wireless LAN module, or the like, and is an interface for performing wired or wireless communication via a network. For example, it is used for communicating with the servo motor 1 or transmitting information associated with control of the servo motor 1 to the outside. The input device 24 is a device for performing an input, such as a mouse, a keyboard, or the like, and as will be described later, may input an instruction as to whether to perform relearning. The output device 25 is a device for performing an output, such as a speaker. The display device 26 may be configured by a display or the like, and may display that there is an anomalous input, for example. The external interface 27 is a USB (universal serial bus) port or the like, and is an interface for connecting to an external device.

The drive 28 is, for example, a CD (compact disk) drive, a DVD (digital versatile disk) drive, or the like, and is a device for reading a program stored in a storage medium 91. The type of the drive 28 may be appropriately selected according to the type of the storage medium 91. At least one of the various data 221 to 226 stored in the storage part 22 may be stored in the storage medium 91. Further, the motor data 223 may also be stored in the RAM of the control part 21.

The storage medium 91 is a medium which stores information such as a program by electrical, magnetic, optical, mechanical, or chemical actions so that a computer, other devices, machines, or the like can read information of the recorded program. The motor control system 2 may acquire the various data 221 to 226 from the storage medium 91.

Herein, in FIG. 2, a disk type storage medium such as a CD or a DVD is shown as an example of the storage medium 91. However, the type of the storage medium 91 is not limited to the disk type and may be a type other than the disk type. For example, a semiconductor memory such as a flash memory may be listed as an example of a storage medium other than the disk type.

Regarding the specific hardware configuration of the motor control system 2, the components may be omitted, replaced, and added as appropriate according to the implementation. For example, the control part 21 may include a plurality of processors. The motor control system 2 may be configured by a plurality of information processing devices. Further, the motor control system 2 may a general-purpose desktop PC (personal computer), a tablet PC, or the like in addition to an information processing device designed exclusively for the provided service.

<2-2. Functional Configuration of Motor Control System>

Figure 3:
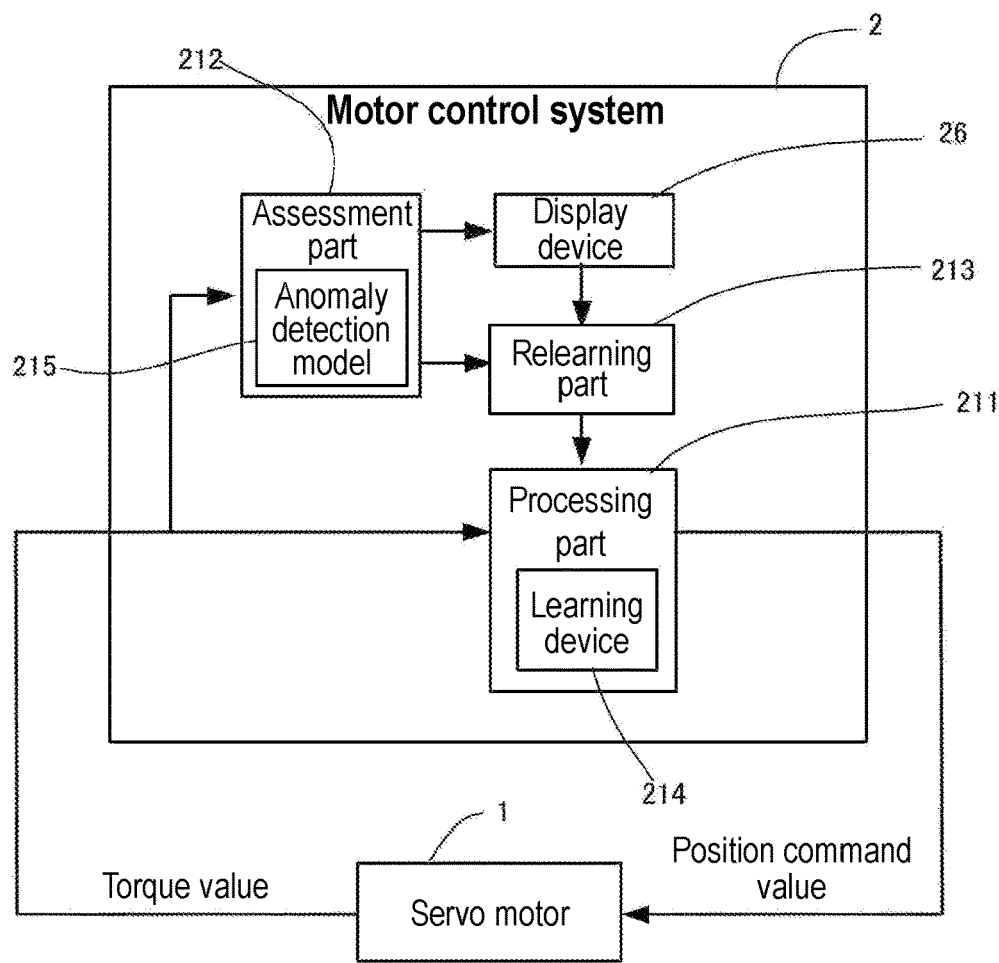
FIG. 3 is a block diagram showing a hardware configuration of the motor control system of FIG. 2.

Next, an example of a functional configuration of the motor control system according to the present embodiment will be described with reference to FIG. 2 and FIG. 3. FIG. 3 is a block diagram showing the functional configuration of the motor control system.

<2-2-1. Schematic Configuration>

The control part 21 of the motor control system 2 develops the control program 221 and the learning assistance program 222 stored in the storage part 22 into the RAM. Then, the control part 21 interprets and executes the programs 221 and 222 developed in the RAM through the CPU to control each component. Accordingly, as shown in FIG. 3, the motor control system 2 according to the present embodiment functions as a computer including a processing part 211, an assessment part 212, and a relearning part 213.

<2-2-2. Processing Part>

The processing part 211 includes a learning device 214 which has learned to take a torque value of the servo motor 1 as an input and output a position command value to the servo motor according to the input. The processing part 211 samples, for example, a torque waveform from the servo motor 1 at an interval of 1 ms, and outputs the position command value outputted from the learning device 214 to the servo motor 1 according to the torque waveform.

The learning device 214 which outputs such a position command value is configured by, for example, a neural network. Specifically, as shown in FIG. 4, it is a multi-layered neural network used for so-called deep learning, and includes, in a sequence from the input, an input layer 71, an intermediate layer (hidden layer) 72, and an output layer 73.

Figure 4:
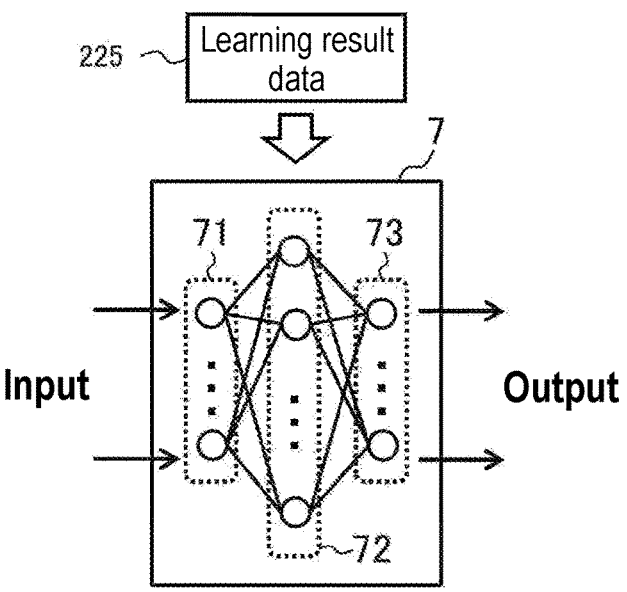
FIG. 4 is a view showing an example of a neural network used in the motor control system of FIG. 2.

In FIG. 4, the neural network 7 includes one layer of the intermediate layer 72, the output of the input layer 71 is the input of the intermediate layer 72, and the output of the intermediate layer 72 is the input of the output layer 73. However, it is possible that the number of the intermediate layer 72 is not limited to one layer, and the neural network 7 may include two or more layers of the intermediate layer 72.

Each of the layers 71 to 73 has one or more neurons. For example, the number of neurons in the input layer 71 may be set according to the number of the servo motor 1. The number of neurons of the intermediate layer 72 may be appropriately set according to the implementation. The output layer 73 may also be set according to the number of the servo motor 1. In other words, the motor control system may be used for control of one servo motor 1 or may control a plurality of servo motors 1 in parallel.

The neurons in adjacent layers are appropriately connected to each other, and a weight (connection weight) is set for each connection. In the example of FIG. 4, each neuron is connected to all neurons in the adjacent layers, but the connection of neurons is not limited to such an example and may be set appropriately according to the implementation.

A threshold value is set for each neuron, and basically, the output of each neuron is determined by whether the sum of products of each input and each weight exceeds the threshold value. The motor control system 2 obtains the position command value from the output layer 73 by inputting the torque waveform to the input layer 71 of such a neural network 7.

The configuration of such a neural network 7 (e.g., the number of layers of the neural network 7, the number of neurons in each layer, the connection relationship between neurons, and the transfer function of each neuron), the weight of the connection between the neurons, and the information indicating the threshold value of the neurons are included in the learning result data 225. The motor control system 2 refers to the learning result data 225 to set the learned learning device 214.

<2-2-3. Assessment Part>

Figure 5A:
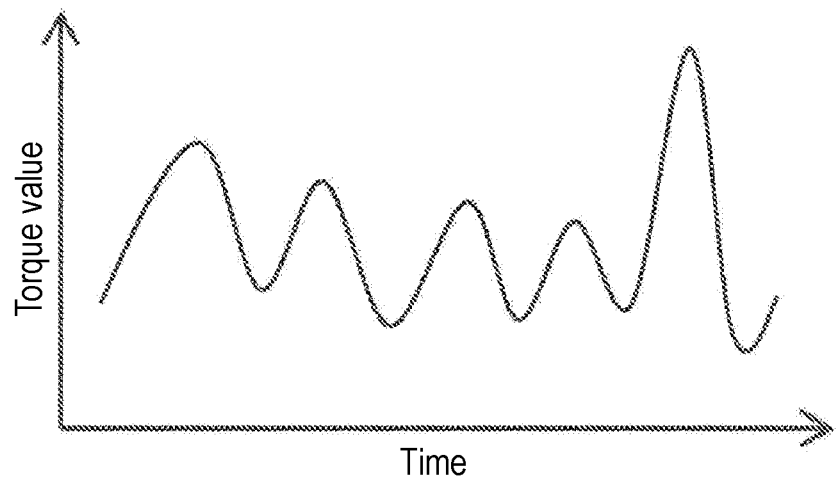
FIG. 5A is a graph showing an example of a normal input of a torque value.
Figure 5B:
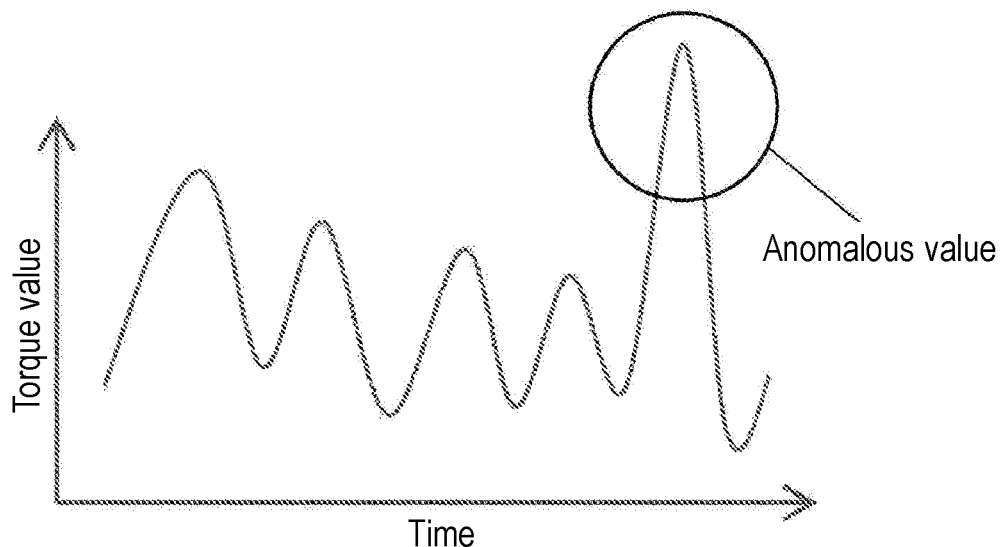
FIG. 5B is a graph showing an example of an anomalous input of a torque value.

The assessment part 212 determines an anomalous input of the torque value. The anomaly in the torque value is caused by, for example, fluctuations of the load on the servo motor 1 such as fluctuations in the work, thermal expansion of the work, or the like, or occurs due to deterioration of the machine such as deterioration over time, wear of tools, or the like. For example, assuming that FIG. 5A is a normal torque waveform, in the case where an anomalously high torque value occurs in the torque waveform as shown in FIG. 5B, it is assumed that there is an anomalous input. While there are various methods for assessing such an anomalous input, one example will be shown below.

Figure 6:
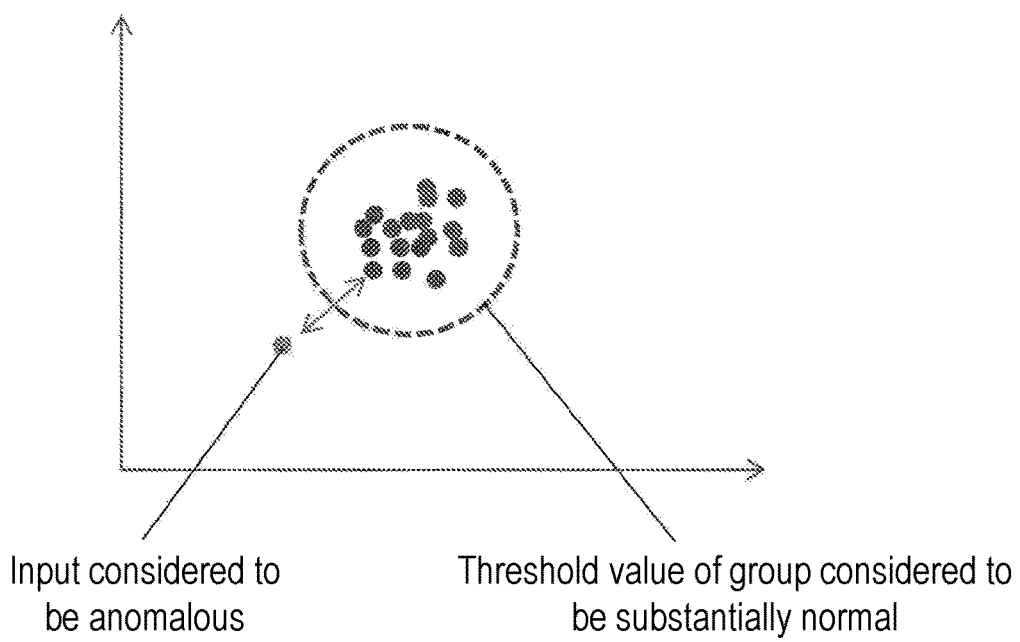
FIG. 6 is a model diagram for assessing an anomaly in the torque value.

First, the torque value of the servo motor 1 is sampled at a cycle of 1 ms. Then, based on the waveform data of the immediately preceding several ms to several tens of ms, a vector having an array of variables is generated, e.g., [maximum amplitude of the interval, number of amplitudes] or [trq(t-N), trq(t-N+1), trq(t-N+2), . . . , trq(t)] (trq(t) is the torque value at time t). Next, a vector is similarly generated from the torque waveform at the normal time and is defined as the normal model (anomaly detection model) 215, based on which the anomalous input is detected. For example, as shown in FIG. 6, in the defined vector space as described above, the degree to which the inputted torque value deviates from the predefined set is calculated. Then, a threshold value is set with respect to the degree of deviation (anomaly), and normality or anomaly is detected. In other words, it is possible to assess as normal in the case where it is within the threshold value and as anomalous in the case where it is out of the threshold value. While the method for finding such an anomalous value is not particularly limited, the LOF (local outer factor) method or the like may be used. Such a threshold value is namely the predetermined reference of the disclosure. In addition, the predetermined reference may be, for example, a reference that there is an anomaly in the case where a normal reference is not satisfied, or may be a reference that there is an anomaly in the case where an anomalous reference is satisfied.

Accordingly, when an anomaly is detected from the inputted torque waveform, the assessment part 212 transmits it to the display device 26 for display. Alternatively, the relearning to be described below may be performed under the condition that an anomaly has occurred.

By displaying the anomalous output on the display device 26, the user can visually recognize the occurrence of the anomaly. At this time, relearning may be performed according to the instruction of the user. In other words, after confirming the occurrence of the anomaly on the display device 26, the user may manually send an instruction for relearning. Alternatively, even in the case of confirming the occurrence of the anomaly, it is possible not to perform relearning according to the determination of the user.

<2-2-4. Relearning Part>

In the case where the assessment part 212 assesses that the input is anomalous, or when the user sends an instruction for relearning, relearning of the learning device 214 is performed in the relearning part 213. There are various methods for relearning, including the following method, for example.

Figure 7:
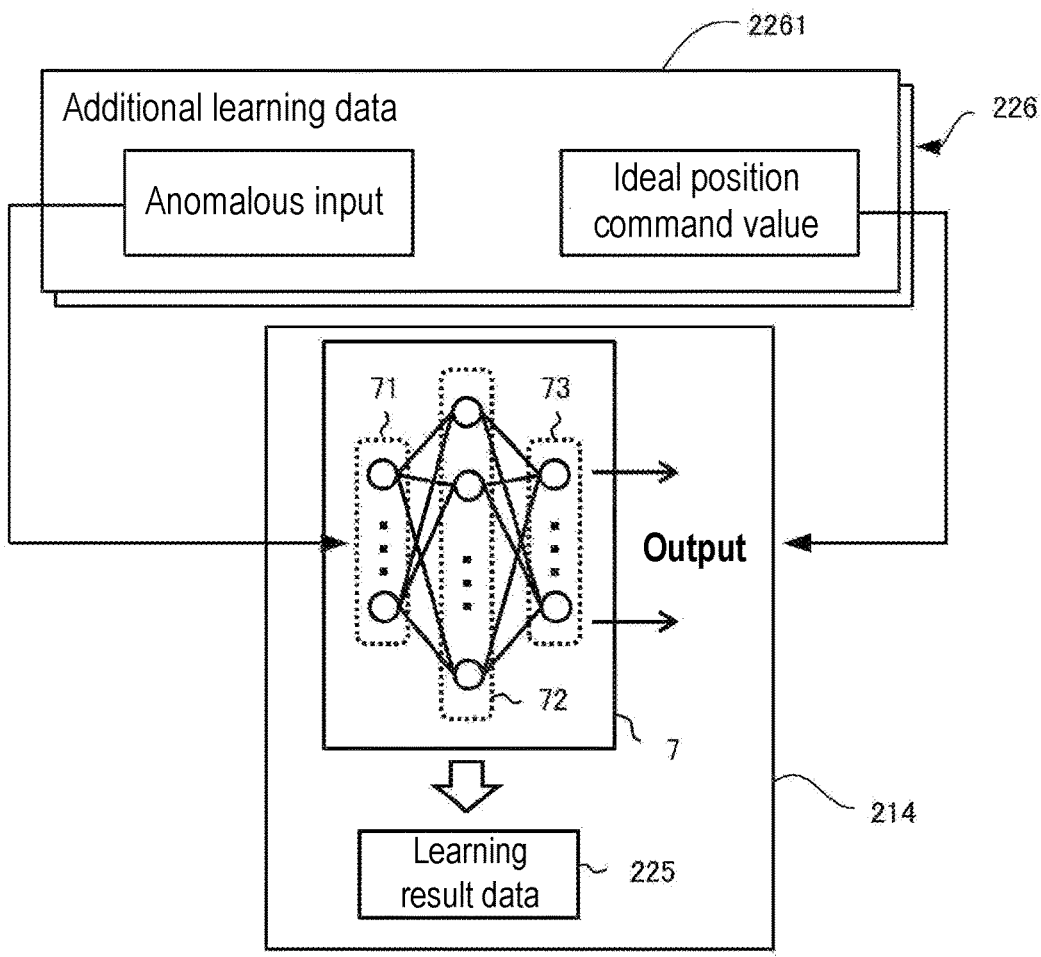
FIG. 7 is a view showing an example of learning of a learning device of the motor control system of FIG. 2.

First, additional learning data 2261 used for learning of the learning device 214 is generated. Then, the additional learning data 2261 is added to the learning data 226 to perform relearning of the learning device 214. For example, as shown in FIG. 7, an anomalous input upon assessment of the anomalous input, and an ideal output with respect to the anomalous input, i.e., a combination of the position command value, are taken as the additional learning data, which is added to the learning data 226 to perform relearning of the learning device 214.

The ideal position command value used herein is generated by various methods and may be generated as follows, for example. First, in the case where there is an anomalous input, the position control by the servo motor 1 is actually performed without learning, and an error with respect to ideal control is calculated from the control result and fed back to generate an ideal position command value.

Figure 8:
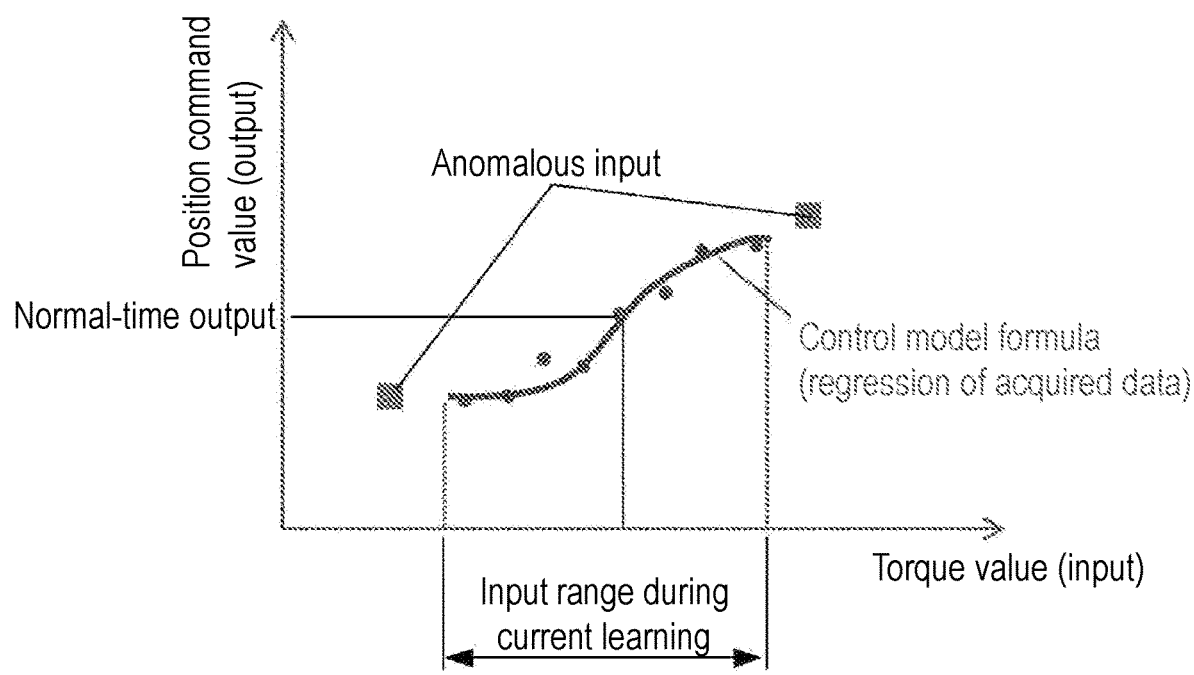
FIG. 8 is a diagram showing an example of a model of processing of the motor control system of FIG. 2.

Alternatively, in the case where the control has a predetermined physical model, i.e., a model capable of simulating a response to a command, the following may be performed. FIG. 8 is an example of a graph showing the relationship between the input and the output. As shown in FIG. 8, the relationship between the input and the output in the current learning device is based on a predetermined control model formula (physical model), and in the case where the input and the output are learned with the control model formula as a reference, for example, when there is an input falling outside the input range which has been learned in the current learning device, the learning device cannot correspond. Therefore, using the control model formula, feedforward is performed from the input response of the anomalous input to generate an ideal position command value.

Accordingly, in the case where the relearning part 213 is instructed to perform relearning with respect to an anomalous input, relearning of the learning device 214 is performed through the additional learning data 2261 having the anomalous input and an ideal position command value corresponding to the anomalous input.

<2-3. Operations of Motor Control System>

Figure 9:
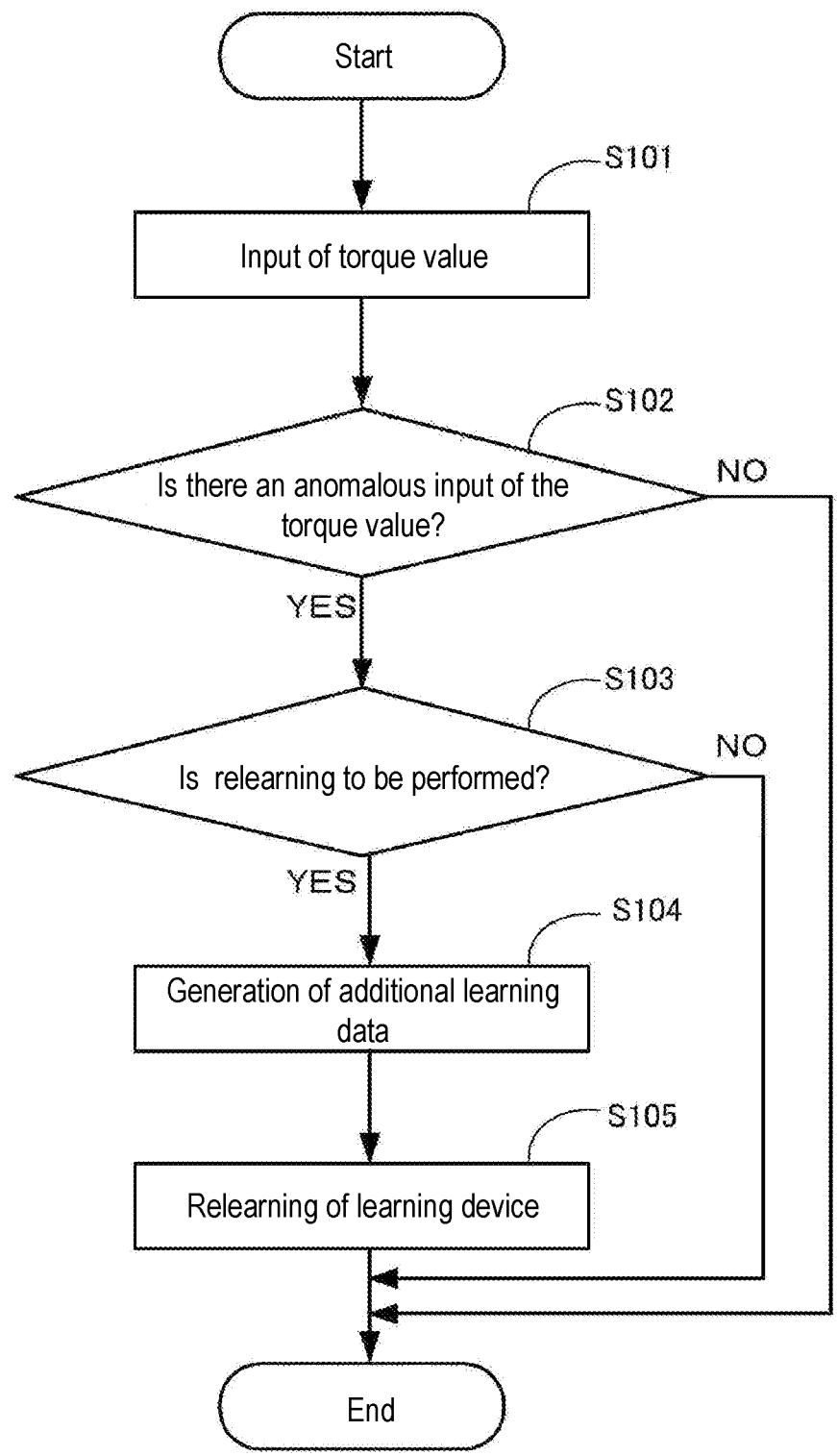
FIG. 9 is a flowchart showing an example of a processing procedure of update of the learning device in the motor control system of FIG. 2.

Next, a processing example of relearning of the learning device 214 in the motor control system 2 will be described with reference to FIG. 9. FIG. 9 is a flowchart showing an example of a processing procedure of the motor control system. The processing procedure described below is merely an example, and each processing may be changed wherever possible. Further, in the processing procedure described below, steps may be omitted, replaced, and added as appropriate according to the implementation.

As shown in FIG. 9, first, a torque value is inputted to the motor control system from the servo motor 1 (step S101). With respect to the torque value, the processing part 211 outputs a position command value by the learning device 214 and responds to the servo motor 1. In parallel with this, the assessment part 212 assesses whether the inputted torque value is an anomalous input (step S102). In the case of assessing that it is not an anomalous input (NO in step S102), relearning is not performed. On the other hand, in the case where the assessment part 212 assesses that it is an anomalous input (YES in step S102), the anomalous input is displayed on the display device 26. Herein, in the case where the user who checks the display device 26 determines to perform relearning (YES in step S103), additional learning data is generated in the relearning part 213 (step S104). Then, the additional learning data 2261 is added to the learning data 226 to perform relearning of the learning device 214 (step S105). Accordingly, the learning device 214 is made to learn to output an ideal output with respect to an anomalous input. In addition, after the assessment part 212 assesses that the input is anomalous, relearning may be performed without the determination of the user.

The timing of updating the learning device 214 after relearning of the learning device 214 has been performed is not particularly limited, but the update may be performed at the following timings, for example. First, the learning device 214 may be updated immediately before the next control cycle (i.e., the cycle in which the control processing of the servo motor 1 is executed) after the relearning is completed. Alternatively, the user may specify in advance a state (e.g., determining by referring to the state of the servo motor or device) which can ensure to some extent that the processing system 10 will operate stably after the previous update of the learning device 214, and the update may be performed at that timing. Specifically, update may be performed when reaching the stop position of the periodic operation or when entering the maintenance mode.

3. FEATURES

As described above, according to the present embodiment, when it is assessed that there is an anomalous input, by performing learning of the learning device 214, the learning device 214 can undergo learning so that an ideal output can be generated even with an anomalous input. In other words, in the present embodiment, since the relearning of the learning device 214 is triggered by the occurrence of the anomalous input, relearning of the learning device 214 can be efficiently performed without having the user arbitrarily set the timing of relearning of the learning device 214. Moreover, since the update of the learning device 214 with respect to the anomalous input can be performed without delay, the accuracy of the output of the learning device can be improved.

4. MODIFICATION EXAMPLES

Although the embodiment of the disclosure has been detailed above, the above description is merely an example of the disclosure in all respects. Obviously, various improvements and modifications may be made without departing from the scope of the disclosure. For example, the following changes are possible. In addition, in the following, the same symbols will be used for the same components as in the above embodiment, and descriptions of the same points as in the above embodiment will be appropriately omitted. The following modification examples may be combined as appropriate.

<1>

Figure 10:
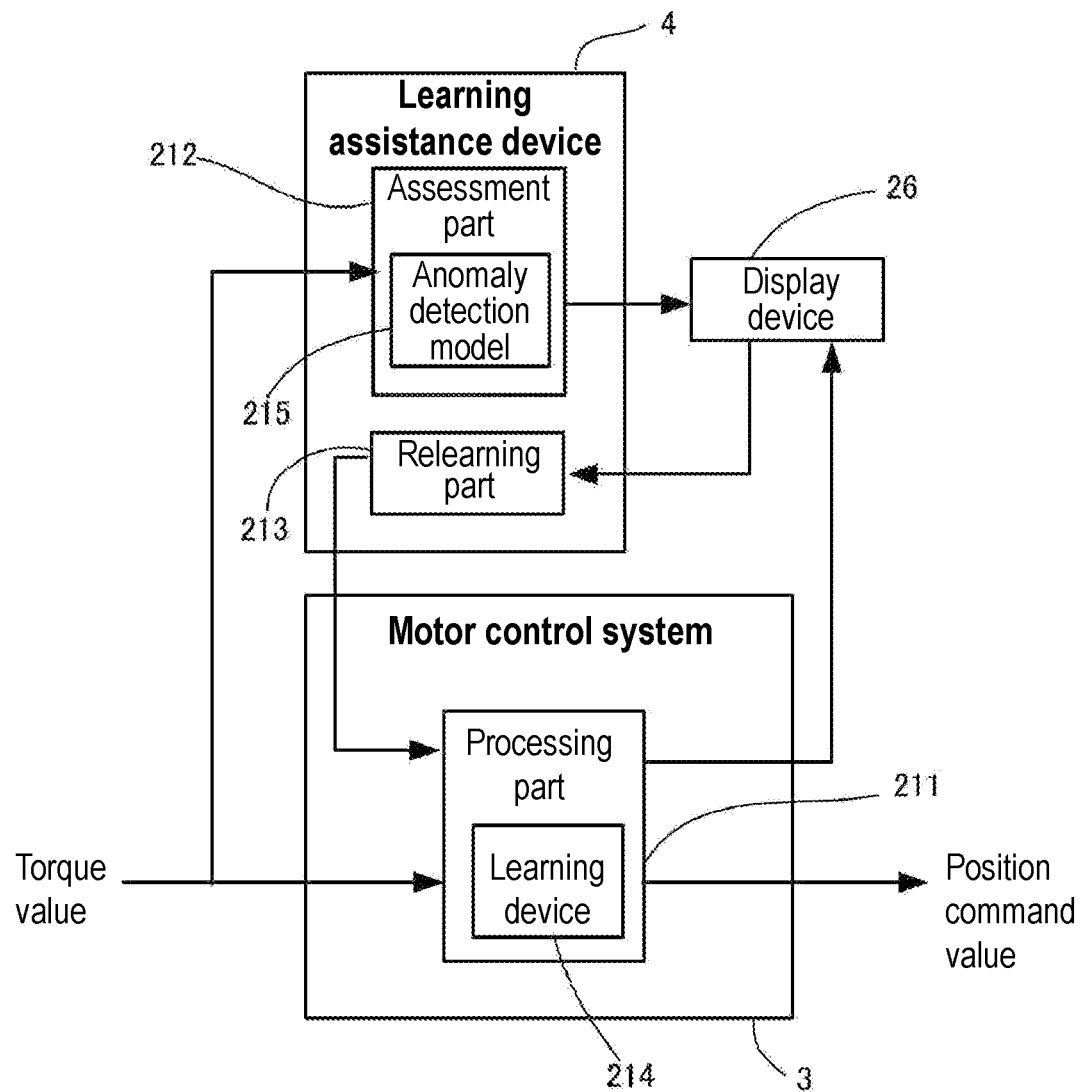
FIG. 10 is a block diagram showing another example of the configuration of the learning assistance device and the motor control system according to the disclosure.

In the above embodiment, although the learning assistance device according to the disclosure is incorporated in the motor control system, it is also possible to provide the learning assistance device independently of the motor control system and perform relearning of the learning device by communicating with the motor control system. For example, as shown in FIG. 10, a learning assistance device 4 having an assessment part 212 and a relearning part 213 may be provided separately from a motor control system 3 having a processing part 211, and the learning assistance device 4 may perform relearning on a learning device 214 of the processing part 211. In that case, for example, the relearning part 213 may generate new learning result data 225 and transmit it to the processing part 211, and the processing part 211 can update the learning result data 225.

<2>

As described above, there are various methods for assessing an anomalous input in the assessment part 212, which are not limited to the above embodiment. Similarly, the generation of the additional learning data 2261 for performing relearning is not particularly limited, and the additional learning data 2261 may be generated by various methods.

<3>

The means (notification part) for notifying a user of the occurrence of an anomalous input is not particularly limited. For example, in the above embodiment, in the case where there is an anomalous input, this fact is displayed on the display device 26, but it is also possible to notify the user of the anomalous input by sound. In other words, the notification part may be a sound emitting device such as a speaker instead of the display device 26, or may be the display device 26 and the sound emitting device. Then, the user may send a relearning command after learning by sound that there is an anomalous input.

<4>

In the above example, a general feedforward neural network having a multi-layered structure is used as the neural network 7. However, the type of each neural network 7 is not limited to such an example and may be appropriately selected according to the implementation. For example, each neural network 7 may be a convolutional neural network which uses the input layer 71 and the intermediate layer 72 as a convolutional layer and a pooling layer. Also, for example, each neural network 7 may be a recursive neural network having a connection recursing from the output side to the input side, such as from the intermediate layer 72 to the input layer 71. The number of layers of each neural network 7, the number of neurons in each layer, the connection relationship between the neurons, and the transfer function of each neuron may be appropriately determined according to the implementation.

<5>

The type of the learning device 214 is not particularly limited, and in addition to the neural network, it may also be, for example, a decision tree, a support vector machine, a self-organizing map, or a learning device which performs learning by reinforcement learning.

<6>

Although the above embodiment has shown the example in which the learning assistance device of the disclosure is applied to the motor control system, the disclosure is not limited thereto and may be applied to various systems. In other words, the disclosure may be appropriately applied to a system which performs an output from an input by a learning device and in which an input anomaly may occur.

What is claimed is:

1. A learning assistance device for performing relearning on a processing part having a learned learning device which has undergone learning for generating a predetermined output from a predetermined input, the learning assistance device comprising one or more processors configured to:
assess an anomaly of the input based on a predetermined reference, an anomaly in the input comprising an input falling outside an input range which has been learned in the learning device; and
in the case where the one or more processors assess that the input is an anomalous input:
generate an output with respect to the anomalous input based on a predetermined physical model capable of simulating servo motor responses to position control commands;
output, by the processing part, the generated output, the generated output comprising a position control command;
generate an ideal output with respect to the anomalous input by performing feedback control on the generated output outputted by the processing part from the anomalous input, the ideal output having an accuracy greater than an accuracy of the generated output outputted by the processing part, wherein the ideal output is generated with respect to the anomalous input based on the predetermined physical model; and
perform relearning of the learning device by taking the anomalous input and the ideal output with respect to the anomalous input as additional learning data under a predetermined condition.

2. The learning assistance device according to claim 1, wherein the one or more processors are configured to perform the relearning on condition that the one or more processors assess that the input is an anomalous input.

3. The learning assistance device according to claim 1, wherein in the case where the one or more processors assess that the input is an anomalous input, the one or more processors generate a notification of an occurrence of the anomalous input.

4. The learning assistance device according to claim 1, wherein in the case where the one or more processors assess that the input is an anomalous input, the one or more processors generate a notification of an occurrence of the anomalous input,
wherein the one or more processors are configured to perform relearning when a command for relearning is sent in the case where the occurrence of the anomalous input is notified.

5. A processing system which generates a predetermined output from a predetermined input, the processing system comprising:
a processing part having a learned learning device which has undergone learning for generating the predetermined output from the predetermined input; and
the learning assistance device according to claim 1.

6. A learning assistance method for performing relearning on a processing part having a learned learning device which has undergone learning for generating a predetermined output from a predetermined input, the learning assistance method comprising:
assessing an anomaly of the input based on a predetermined reference;
in the case where it is assessed that the input is an anomalous input:
generating an output with respect to the anomalous input based on a predetermined physical model capable of simulating servo motor responses to position control commands;
outputting, by the processing part, the generated output, the generated output comprising a position control command;
generating an ideal output with respect to the anomalous input by performing feedback control on the generated output outputted by the processing part from the anomalous input, the ideal output having an accuracy greater than an accuracy of the generated output outputted by the processing part, wherein the ideal output is generated with respect to
the anomalous input based on the predetermined physical model; and
performing, in the case where it is assessed that the input is an anomalous input, relearning of the learning device by taking the anomalous input and the ideal output with respect to the anomalous input as additional learning data under a predetermined condition.

7. The learning assistance method according to claim 6, wherein in the case where it is assessed that the input is an anomalous input, the relearning is performed.

8. The learning assistance method according to claim 6, wherein in the case where it is assessed that the input is an anomalous input, the learning assistance method further comprises generating a notification of occurrence of the anomalous input.

9. The learning assistance method according to claim 8, wherein in the case where the occurrence of the anomalous input is notified, the learning assistance method further comprises determining whether the relearning is necessary, and in the case where it is determined that the relearning is necessary, the relearning is performed.

10. A non-transitory storage medium storing a learning assistance program for performing relearning on a processing part having a learned learning device which has undergone learning for generating a predetermined output from a predetermined input, the learning assistance program causing a computer to execute steps below:

assessing an anomaly of the input based on a predetermined reference;

in the case where it is assessed that the input is an anomalous input:

generating an output with respect to the anomalous input based on a predetermined physical model capable of simulating servo motor responses to position control commands;

outputting, by the processing part, the generated output, the generated output comprising a position control command;

generating an ideal output with respect to the anomalous input by performing feedback control on the generated output outputted by the processing part from the anomalous input, the ideal output having an accuracy greater than an accuracy of the generated output outputted by the processing part, wherein the ideal output is generated with respect to the anomalous input based on a predetermined physical model; and performing, in the case where it is assessed that the input is an anomalous input, relearning of the learning device by taking the anomalous input and the ideal output with respect to the anomalous input as additional learning data under a predetermined condition.

* * * * *